(12) United States Patent
Bernhardt et al.

(10) Patent No.: US 8,714,861 B2
(45) Date of Patent: May 6, 2014

(54) SEALING ASSEMBLY OF A BALL JOINT AND BALL JOINT

(75) Inventors: Peter Bernhardt, Wuppertal (DE); Andreas Maier, Solingen (DE); Ulrich Mette, Essen (DE); Cengiz Erdogan, Geldern (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 12/922,964

(22) PCT Filed: Mar. 18, 2009

(86) PCT No.: PCT/EP2009/001998
§ 371 (c)(1), (2), (4) Date: Oct. 11, 2010

(87) PCT Pub. No.: WO2009/115309
PCT Pub. Date: Sep. 24, 2009

(65) Prior Publication Data
US 2011/0020056 A1    Jan. 27, 2011

(30) Foreign Application Priority Data

Mar. 18, 2008 (DE) .......................... 10 2008 014 695

(51) Int. Cl.
*F16C 11/00* (2006.01)

(52) U.S. Cl.
USPC .............................. 403/134; 403/90; 277/635

(58) Field of Classification Search
USPC ..................... 403/90, 134; 277/635
See application file for complete search history.

(56) References Cited

U.S. PATENT DOCUMENTS

| 4,322,175 A | * | 3/1982 | Szczesny | 403/134 |
| 5,466,084 A | * | 11/1995 | Brueggen et al. | 403/134 |
| 5,931,597 A | * | 8/1999 | Urbach | 403/134 |
| 6,350,075 B1 | * | 2/2002 | Abels | 403/134 |
| 6,814,521 B2 | * | 11/2004 | Suzuki et al. | 403/134 |
| 7,070,355 B2 | * | 7/2006 | Abels et al. | 403/50 |

(Continued)

FOREIGN PATENT DOCUMENTS

| CN | 1875197 A | 12/2006 |
| CN | 1910376 A | 2/2007 |

(Continued)

OTHER PUBLICATIONS

International Search Report for PCT/EP2009/001998 dated Jun. 22, 2009.
German Search Report for DE 10 2008 014 695.1 dated Dec. 17, 2009.

*Primary Examiner* — Daniel P. Stodola
*Assistant Examiner* — Jonathan Masinick
(74) *Attorney, Agent, or Firm* — MacMillan, Sobanski & Todd, LLC

(57) ABSTRACT

A sealing assembly of a ball joint, in particular for a vehicle, comprises a retaining ring which includes a ring axis and a radial ring flange having a flange upper side and an opposed flange lower side, and a sealing element which rests against the flange upper side and against the flange lower side and is exclusively connected to the retaining ring with an interlocking fit, the interlocking fit being configured such that the retaining ring and the sealing element are fixed to each other free of play in the axial and in the radial direction, and the flange upper side having an exposed contact surface for a sealing bellows.

9 Claims, 8 Drawing Sheets

(56) References Cited

U.S. PATENT DOCUMENTS

| | | |
|---|---|---|
| 7,305,864 B2 | 12/2007 | Graber et al. |
| 7,441,979 B2 | 10/2008 | Heidemann et al. |
| 7,931,279 B2 * | 4/2011 | Niwa .............................. 277/630 |
| 7,980,564 B2 * | 7/2011 | Niwa .............................. 277/634 |
| 2003/0118395 A1 | 6/2003 | Abels et al. |
| 2004/0028302 A1 * | 2/2004 | Abels et al. ................... 384/206 |
| 2004/0101353 A1 * | 5/2004 | Abels ............................ 403/122 |
| 2004/0262854 A1 * | 12/2004 | Matczak et al. ............... 277/635 |
| 2007/0051171 A1 | 3/2007 | Garber et al. |
| 2007/0092329 A1 | 4/2007 | Heidemann et al. |

FOREIGN PATENT DOCUMENTS

| | | | |
|---|---|---|---|
| DE | 1266074 B | 4/1968 | |
| DE | 102004001465 B4 | 10/2005 | |
| EP | 1052418 A2 | 11/2000 | |
| FR | 2754024 A1 | 4/1998 | |
| JP | 01193405 A * | 8/1989 | .............. F16C 11/06 |
| JP | 02199317 A * | 8/1990 | .............. F16C 11/06 |
| JP | 02221711 A * | 9/1990 | .............. F16C 11/06 |
| JP | 03074625 A * | 3/1991 | .............. F16C 11/06 |

* cited by examiner

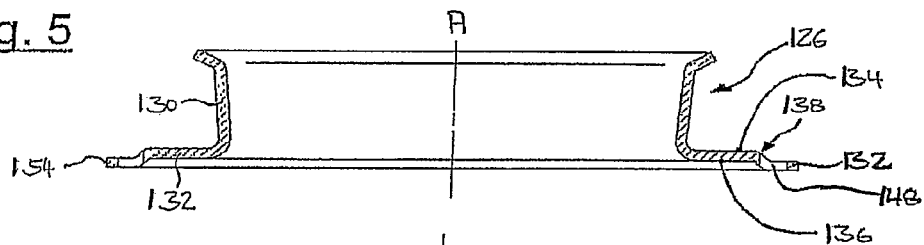
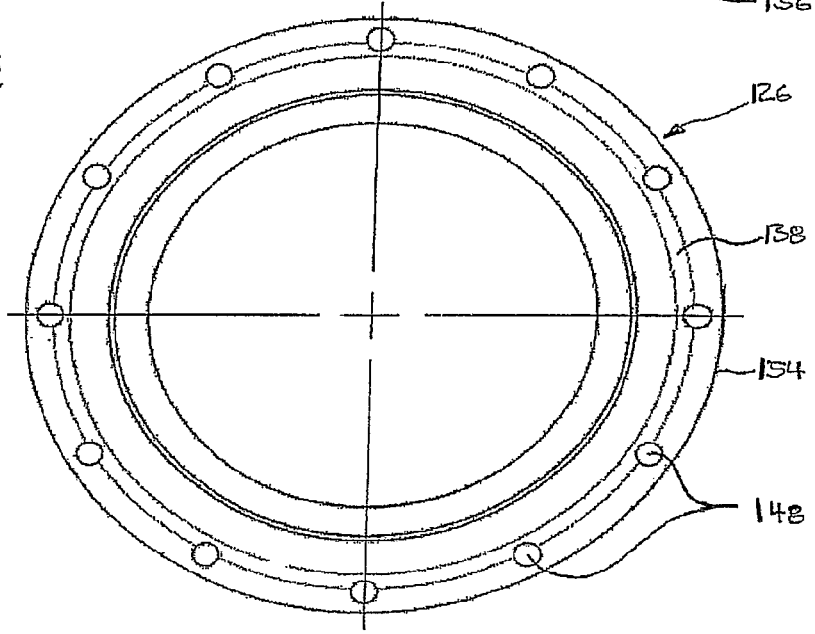
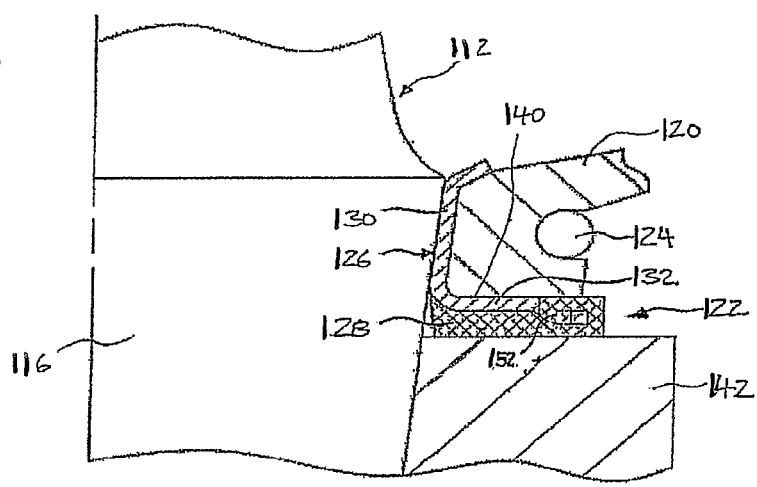

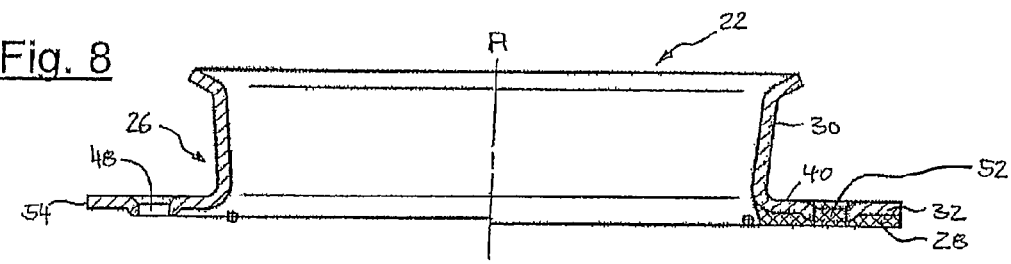
Fig. 8
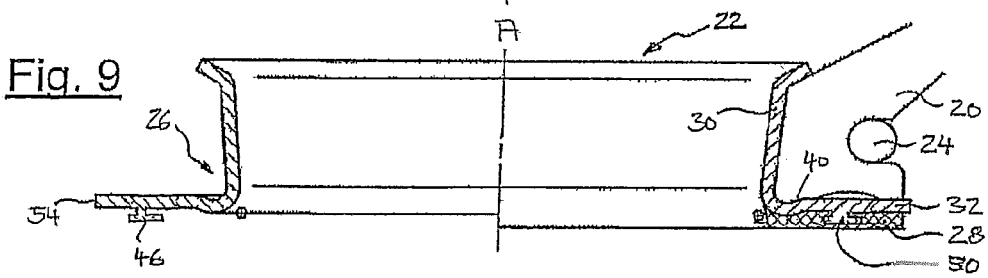
Fig. 9
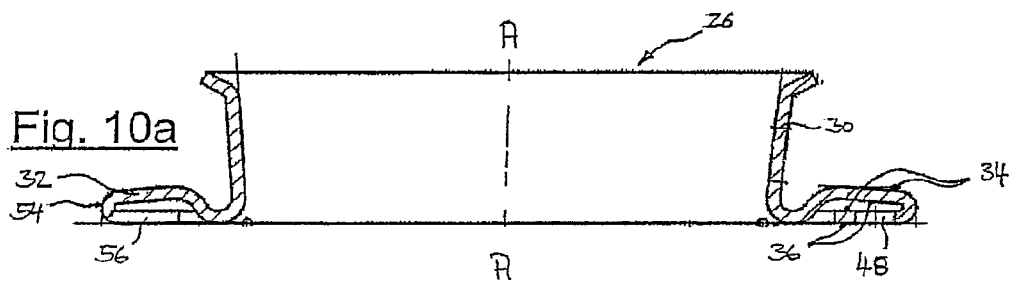
Fig. 10a
Fig. 10b
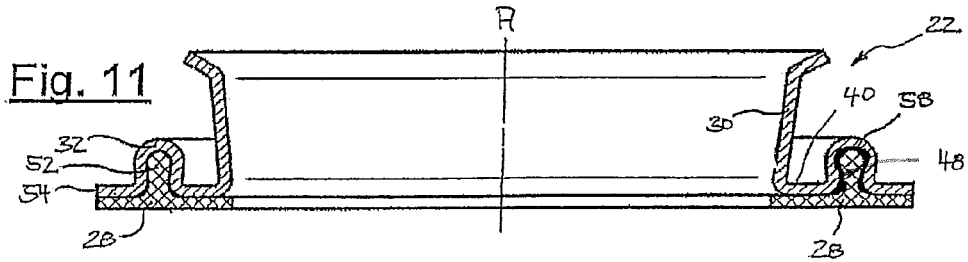
Fig. 11

SEALING ASSEMBLY OF A BALL JOINT AND BALL JOINT

CROSS-REFERENCE TO RELATED APPLICATIONS

This application is a national stage of International Application No. PCT/EP2009/001998 filed Mar. 18, 2009, the disclosures of which are incorporated herein by reference in entirety, and which claimed priority to German Patent Application No. 10 2008 014 695.1 filed Mar. 18, 2008, the disclosures of which are incorporated herein by reference in entirety.

BACKGROUND OF THE INVENTION

The invention relates to a sealing assembly of a ball joint, in particular for a vehicle, and to a ball joint having such a sealing assembly.

Ball joints for motor vehicles are generally known and are usually protected against the penetration of dirt and moisture and against the escape of joint grease by means of a sealing bellows or a sealing cup. In today's usual embodiments, the sealing bellows is sealingly attached on both sides, i.e. to the joint housing and to the ball stud so that the joint is sealed and a reliable joint function is ensured.

However, in the conventional attachment variants, a rusting of the ball stud and a malfunction of the sealing can occur due to a capillary action via the components attached adjacent thereto.

A possible remedy to this problem is proposed in DE 10 2004 063 013 A1, and corresponding U.S. Patent No. 2010/0025950A1, the disclosures of both of which are incorporated by reference herein in entirety, for example. In this document, a support ring is provided which has a seal mounted to a shaft flange profile with an inter-material bond and which statically seals the joint sealing system with respect to the lever socket. The inter-material joint between the seal and the support ring however constitutes a complicated and cost-intensive solution.

Document JP 2 199 317 discloses a ball joint having a support ring, in which a seal is fastened in a similar manner, the seal and the support ring being bonded to each other. In one embodiment, the sealing element is pulled around the outer edge of the support ring flange.

BRIEF SUMMARY OF THE INVENTION

The invention is directed to a sealing of a ball joint, which is as reliable, simple and cost-effective as possible.

This is achieved by a sealing assembly of a ball joint according to the invention, in particular for a vehicle, comprising a retaining ring which includes a ring axis and a radial ring flange having a flange upper side and an opposed flange lower side, and a sealing element which rests against the flange upper side and against the flange lower side and is exclusively connected to the retaining ring with an interlocking fit, the interlocking fit being configured such that the retaining ring and the sealing element are fixed to each other free of play in the axial and in the radial direction, and the flange upper side having an exposed contact surface for a sealing bellows. Fixed in the axial direction means more precisely that the retaining ring and the sealing element are fixed to each other free of play in both axial directions. As a result of the exclusive interlocking fit between the sealing element and the retaining ring, it is possible to do without expensive adhesives or adhesion promoters. Furthermore, the pure interlocking fit also simplifies the manufacturing method of the sealing assembly so that the material and manufacturing costs are generally reduced.

In other respects, this is also achieved by a sealing assembly of a ball joint, in particular for a vehicle, comprising a retaining ring having a ring axis and a radial ring flange, and a sealing element connected to the retaining ring with an interlocking fit, at least one projection and/or at least one recess being provided on the ring flange, and the projection of the ring flange engaging in a recess of the sealing element, or a projection of the sealing element engaging in the recess of the ring flange, respectively, to realize the interlocking fit. Due to a simple interlocking fit, a durable, reliable and cost-effective fastening of the sealing element to the retaining ring is also realized in this case.

In this alternative solution, the sealing element can selectively also be attached to the retaining ring free of play in the axial and in the radial direction by means of the interlocking fit.

Other advantages of this invention will become apparent to those skilled in the art from the following detailed description of the preferred embodiments, when read in light of the accompanying drawings.

BRIEF DESCRIPTION OF THE DRAWINGS

FIG. 5 shows a section through a retaining ring of the sealing assembly of the invention according to a second embodiment;

FIG. 6 shows a top view on the retaining ring according to FIG. 5;

FIG. 7 shows a detail section through the ball joint according to the invention having a sealing assembly of the invention according to the second embodiment;

FIG. 8 shows a section through the sealing assembly of the invention according to a third embodiment;

FIG. 9 shows a section through the sealing assembly of the invention according to a fourth embodiment;

FIGS. 10a and 10b show sections through a retaining ring and the overall sealing assembly of the invention according to a fifth embodiment, respectively;

FIG. 11 shows a section through the sealing assembly of the invention according to a sixth embodiment;

DETAILED DESCRIPTION OF THE INVENTION

Figure 1:
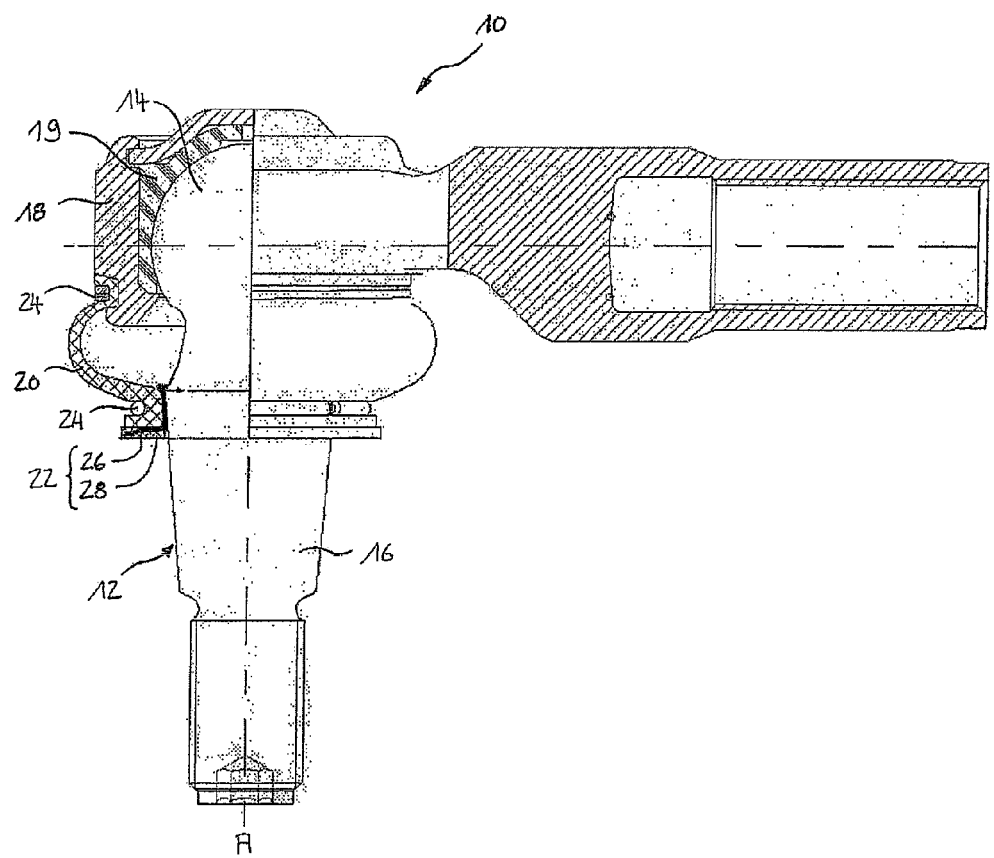
FIG. 1 shows a sectional drawing through a ball joint according to the invention having a sealing assembly according to the invention.

FIG. 1 shows a ball joint 10, in particular for a vehicle, having a ball stud 12 including a ball head 14 and a shank portion 16, a joint housing 18 with a bearing shell 19, which can receive the ball head 14, a sealing bellows 20 for sealing a transition region between the ball stud 12 and the joint housing 18, and a sealing assembly 22. The sealing bellows 20 is fastened, on the one hand, to the joint housing 18 by means of clamping rings 24, and, on the other hand, to the shank portion 16 of the ball stud 12 by means of the sealing assembly 22. The sealing assembly 22 has a retaining ring 26 and a sealing element 28 connected to each other with an interlocking fit.

The cross-section of the retaining ring 26 preferably has a L-profile.

Figure 2:
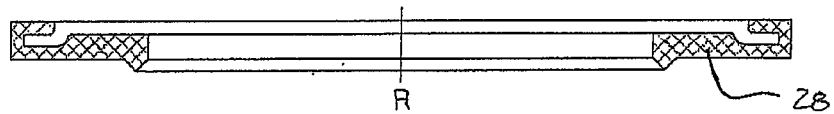
FIG. 2 shows a section through the sealing element of the sealing assembly of the invention according to a first embodiment.

The general structure and the functioning of the ball joint 10 are already generally known from the prior art and are not described in more detail. The characteristic features of the ball joint 10 according to FIG. 1 are based on the design of the sealing assembly 22 which is described in more detail with reference to the figures below:

FIG. 2 shows a detail section through the sealing element 28 for the sealing assembly 22 according to a first embodiment. An elastomer, in particular a thermoplastic polyurethane (TPU) elastomer is preferably used as material for the sealing element; it can however be made of a different material having similar properties. In this first embodiment, the sealing element 28 is preferably directly injection-molded with the retaining ring 26 and forms an interlocking fit with the latter (see FIG. 3). The use of particular adhesion promoters in the injection molding compound of the sealing element 28 is not necessary as the sealing element is reliably fastened to the retaining ring 26 exclusively by means of the interlocking fit.

The use of a separating agent between the injection molding compound of the sealing element and the retaining ring 26 can optionally be provided in order to prevent an adhesive joint between the retaining ring and the sealing element.

Figure 3:
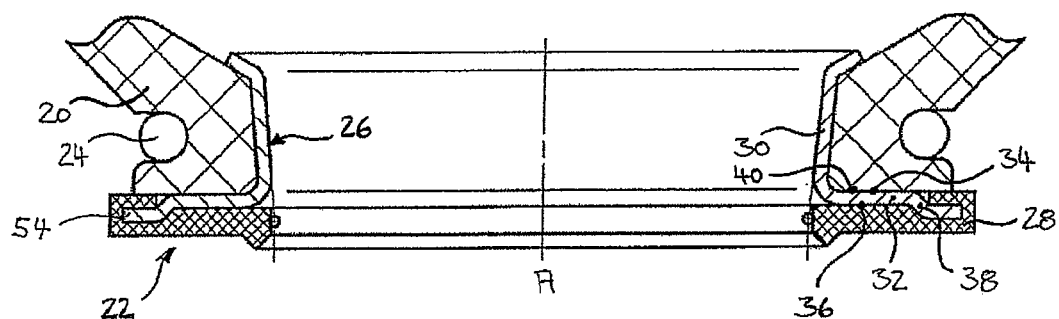
FIG. 3 shows a detail section through the sealing assembly of the invention according to the first embodiment.

FIG. 3 shows a section through the sealing assembly 22 with the sealing bellows 20 mounted.

The retaining ring 26 has a sleeve-shaped portion 30 extending substantially in the axial direction with respect to a ring axis A, the sleeve-shaped portion being also adapted to be conically widened or contracted. A radial ring flange 32 having a flange upper side 34 and a flange lower side 36 integrally adjoins the sleeve-shaped portion 30 of the retaining ring 26.

Figure 4:
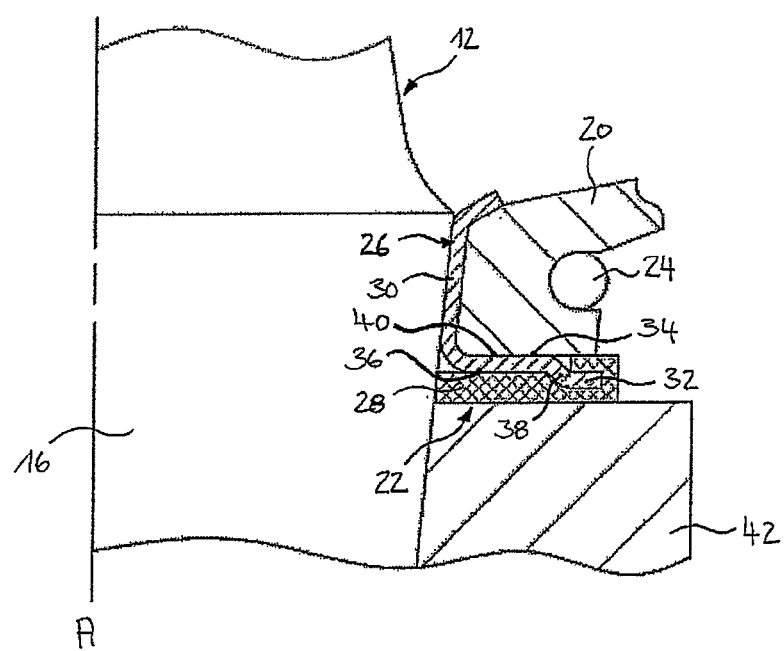
FIG. 4 shows a detail section through the ball joint according to the invention having a sealing assembly of the invention according to the first embodiment.

In the first embodiment according to FIGS. 2 to 4, the sealing element 28 engages around a radially outer peripheral edge 54 of the ring flange 32 (preferably over the entire peripheral edge 54) so that an interlocking fit free of play is realized between the retaining ring 26 and the sealing element 28 both in the radial and in the axial direction. The ring flange 32 has a surrounding axial step 38 so that the sealing element 28 does not project beyond the flange upper side 34 in the axial direction despite the engagement around the edge. This simplifies the direct resting of the sealing bellows 20 against an exposed contact surface 40 provided on the flange upper side 34 (see FIG. 3).

The sealing element 28 can also be manufactured separately from the retaining ring 26, wherein in this embodiment, the sealing element is provided with a radial groove, similar to a pocket, into which the peripheral edge 54 is inserted.

FIG. 4 shows a further detail section through the sealing assembly 22 according to the first embodiment, the sealing assembly 22 being already mounted to a ball joint 10. The sleeve-shaped portion 30 rests against the shank portion 16 of the ball stud 12, and the sealing element 28 rests against an adjacent component 42. Furthermore, both the sleeve-shaped portion 30 and the ring flange 32 each form a contact surface 40 against which the sealing bellows 20 directly rests in the assembled state of the ball joint 10.

FIG. 5 shows a section through the retaining ring 126 of the sealing assembly 122 according to a second embodiment. This second embodiment differs from the first embodiment according to FIGS. 2 to 4 only in that recesses 148, here through openings, are provided in the ring flange 132.

In the radial direction, the recesses 148 are arranged approximately in the region of the axial step (FIG. 5) and are uniformly distributed over the periphery of the ring flange 132 (see top view in FIG. 6).

In this variant embodiment, the sealing element 128 is also preferably directly injection-molded with the retaining ring 126 so that the material of the sealing element 128 completely fills the recesses thus forming a projection 152, and contributes to a reinforcement of the interlocking fit between the sealing element 128 and the retaining ring 126 (FIG. 7). An interlocking fit is in particular realized by these recesses 148, by means of which the retaining ring 126 and the sealing element 128 are also fixed to each other free of play in the peripheral direction.

FIGS. 8 and 9 each show a section through the sealing assembly 22 according to a third and a fourth embodiment, respectively, the retaining ring 26 without the sealing element 28 being respectively represented on the left side, and the retaining ring 26 with the sealing element 28 being respectively represented on the right side. In the third embodiment, the ring flange 32 has recesses 48, preferably through openings 44, which have a chamfer adjacent to the flange upper side 34. The realized cone forms part of the flange upper side and ensures the interlocking fit in one of the axial directions and in the radial directions. The cone prevents a downward movement of the sealing element 28 with respect to the ring flange 32 (see FIGS. 8 and 9) without the sealing element 28 engaging around the peripheral edge 54 of the ring flange 32.

In alternative variant embodiments, it is not necessary that the ring flange has through openings.

To form the interlocking fit, it is generally sufficient that the ring flange 32 is provided with at least one projection 46 and/or at least one recess 48, the projection 46 of the ring flange 32 engaging in a recess 50 of the sealing element 28 (see FIG. 8), and a projection 52 of the sealing element 28 engaging in the recess 48 of the ring flange 32 (FIG. 9), respectively.

This at least one projection 46, 52 and the at least one recess 48, 50 are preferably configured so as to be complementary, so that the retaining ring 26 and the sealing element 28 are fixed to each other free of play in the axial and in the radial direction.

In the embodiments according to FIGS. 1 to 9, the ring flange 32 respectively has a substantially disk-shaped peripheral edge 54 which runs out freely outwards in the radial direction. In contrast thereto, FIGS. 10a and 10b show a fifth embodiment of the sealing assembly 22 in which the ring flange 32 extends radially outwards and defines the outer peripheral edge 54, the ring flange 32 being bent inwards at the outer peripheral edge 54 so that at least parts of the ring flange 32 are configured with two layers. In ring flanges 32 formed in this way, all faces facing the sealing bellows 20 in the assembled state of the ball joint 10 are referred to as flange upper side 34, and all faces of the ring flange 32 facing away from the sealing bellows 20 are referred to as flange lower side 36. Here, the sealing element 28 extends up to between the two layers of the ring flange 32.

In this fifth embodiment, the ring flange 32 can optionally also be provided with slots 56 (see FIGS. 10a and 10b, on the left) or recesses 48 (see FIGS. 10a and 10b, on the right) to reinforce the interlocking fit between the sealing element 28 and the retaining ring 26.

FIG. 11 shows the sealing assembly 22 according to a sixth embodiment in which recesses 48 are formed in the ring flange 32 and projections 52 are formed in the sealing element 28, the projections 52 filling the recesses 48 preferably completely. The projections 52 have a free upper end 58, the projections 52 preferably having a widened section towards their free end 58 (see FIG. 11, on the right). Therefore, due to these cooperating projections 52 and recesses 48, an interlocking fit is again realized by means of which the retaining ring 26 and the sealing element 28 are fixed to each other free of play in the radial and in the axial direction (i.e. more precisely in both axial directions).

Figure 12:
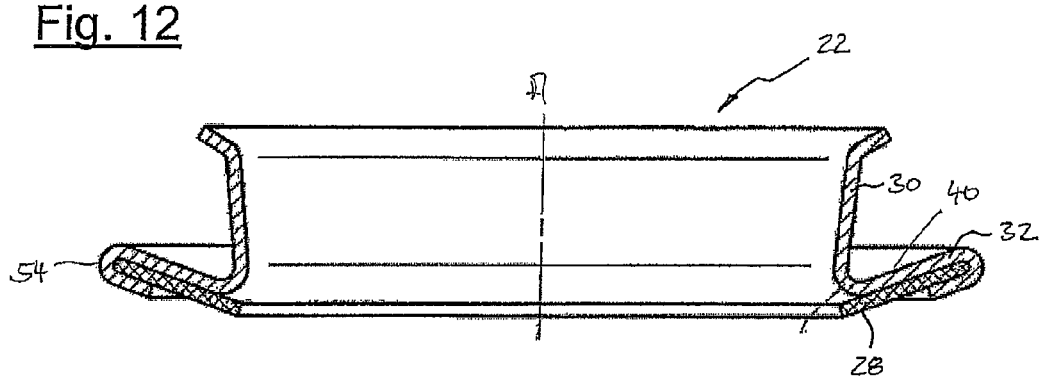
FIG. 12 shows a section through the sealing assembly of the invention according to a seventh embodiment.
Figure 13:
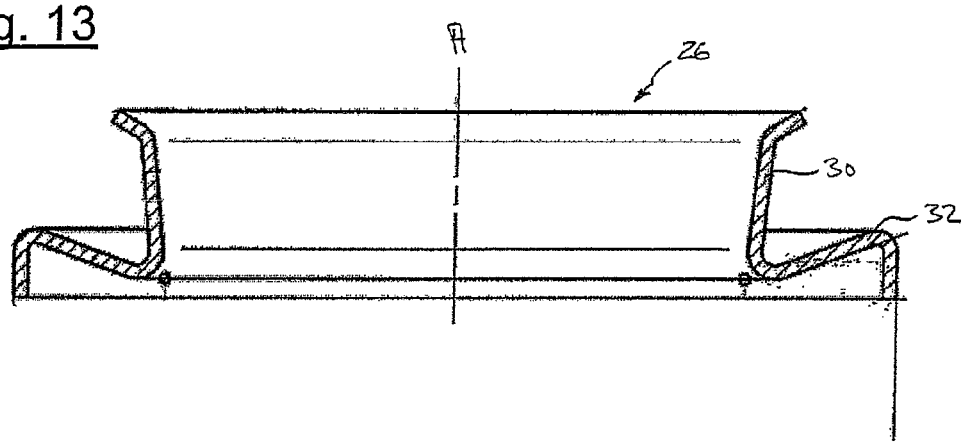
FIG. 13 shows a section through a retaining ring for the sealing assembly of FIG. 12 before mounting of the sealing element.

FIG. 12 shows a seventh embodiment of the sealing assembly 22 in which the interlocking fit between the retaining ring 26 and the sealing element 28 is realized by reshaping the ring flange 32. FIG. 13 shows the initial shape of the retaining ring 26 before a reshaping of the ring flange 32. The planar annular sealing element 28 according to FIG. 14 is moved from the bottom to the retaining ring 26 according to FIG. 13, the ring flange 32 being then reshaped, in particular edged so that the sealing assembly 22 according to FIG. 12 is produced.

Figure 14:
FIG. 14 shows a section through a sealing element for the sealing assembly according to FIG. 12.
Figure 15:
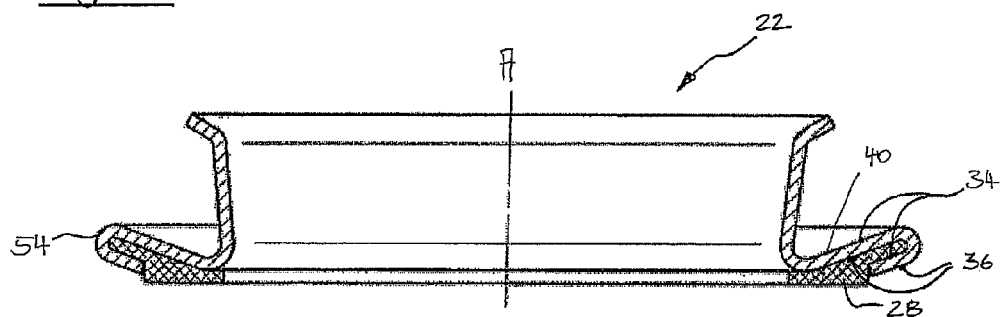
FIG. 15 shows a section through the sealing assembly of the invention according to an eighth embodiment.
Figure 16:
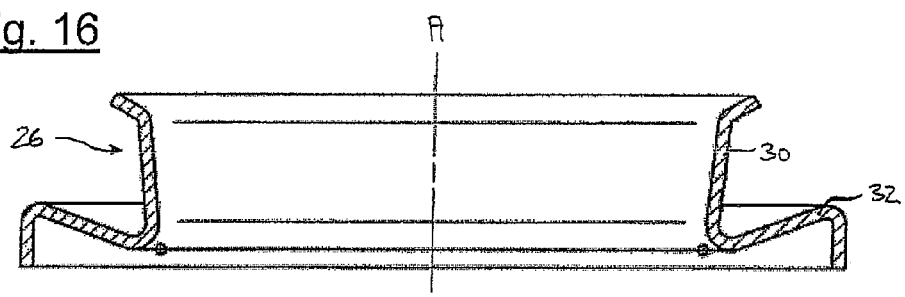
FIG. 16 shows a section through a retaining ring for the sealing assembly according to FIG. 15 before mounting of the sealing element.
Figure 17:
FIG. 17 shows a section through a sealing element for the sealing assembly according to FIG. 15.
Figure 18:
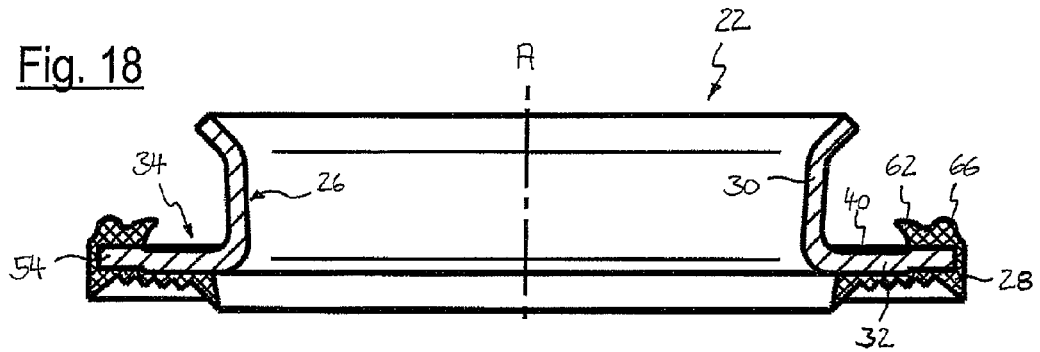
FIG. 18 shows a section through the sealing assembly of the invention according to a ninth embodiment.
Figure 19:
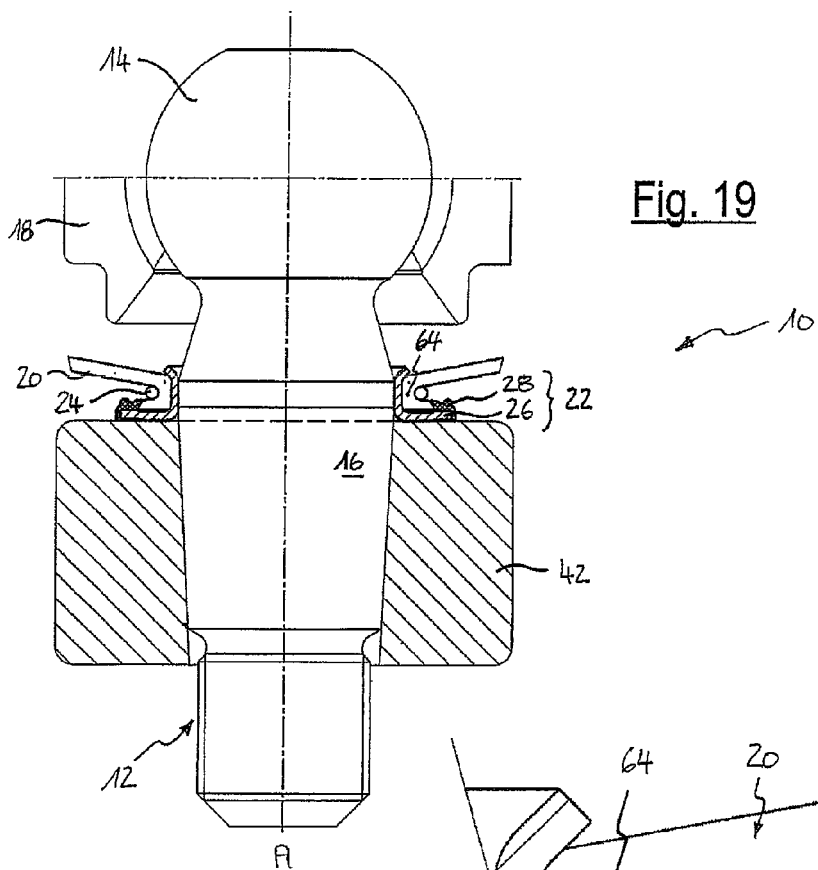
FIG. 19 shows a sectional drawing through a ball joint according to the invention having a sealing assembly according to the ninth embodiment.

FIG. 15 shows the sealing assembly 22 according to an eighth embodiment which is very similar to the seventh embodiment according to FIGS. 12 to 14. The only difference is that the sealing element 28 according to FIG. 17 has a different cross-sectional shape and therefore needs not be deformed when it is guided to the retaining ring 26 (FIG. 16) or upon edging of the ring flange 32. Furthermore, the sealing element 22 in this embodiment includes a resting surface 60 for the component 42 (see FIG. 4) advantageously extending perpendicularly to the ring axis A.

FIGS. 18 to 21 show the sealing assembly 22 according to a ninth embodiment which is very similar to the first embodiment according to FIGS. 1 to 4. Analogously to the first embodiment, an exposed contact surface 40 is provided on the flange upper side 34 facing the sealing bellows 20, so that the sealing bellows 20 rests directly against the ring flange 32 of the retaining ring 26 in the assembled state (see FIG. 20). Moreover, the sealing element 28 also rests against or engages the ring flange 32, more precisely the flange upper side 34 thereof. In contrast to the first embodiment, the sealing element 28 however projects radially outside the contact surface 40, i.e. in the region of the engagement around the edge, in the axial direction beyond the contact surface 40. For a protection and a sealing of the contact point between the retaining ring 26 and the sealing bellows 20, the sealing element 28 has a surrounding sealing lip 62 contacting a bellows mouth 64 of the sealing bellows 20. The bellows mouth 64 has a bellows sealing lip 68, the sealing lip 62 resting against the bellows sealing lip 68, and its cross-sectional shape being adapted to a contour of the bellows sealing lip 68, preferably in that the opposed surfaces are configured in a mirror-inverted manner.

On an end face directed radially inwards, the sealing lip 62 has a concave contour. This concave contour of the sealing lip 62 and the contour of the bellows sealing lip 68 preferably formed complementarily thereto form a self-reinforcing seal between the sealing lip 62 and the bellows sealing lip 68 as an external influence, for example a water jet of a pressure washer incident in this region, does not impair but improves the sealing effect.

Figure 21:
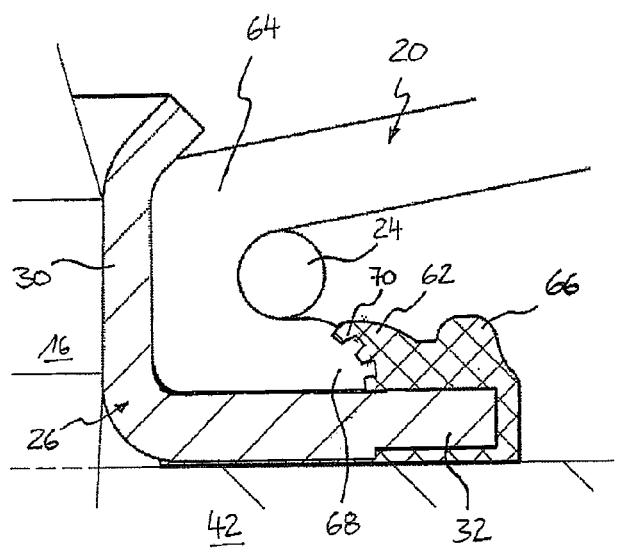
FIG. 21 shows the section detail of FIG. 20 in an alternative configuration.

In a variant embodiment according to FIG. 21, a contact surface between the sealing lip 62 and the bellows sealing lip 68 is formed as a labyrinth seal 70. This labyrinth seal 70 is produced by complementary projections and recesses in the sealing lip 62 and in the bellows sealing lip 68 which results in a toothing leading to a further improvement of the sealing effect. The labyrinth seal 70 can be formed by a planar contact between the sealing lip 62 and the bellows sealing lip 68 or by a meander-shaped small slot between them.

Figure 20:
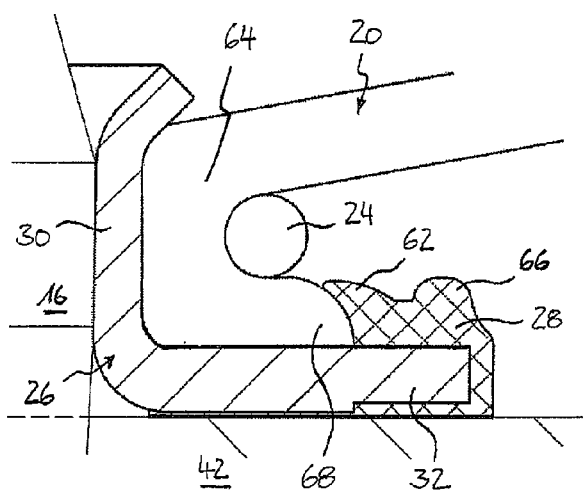
FIG. 20 shows a section detail of the ball joint of FIG. 19.

Furthermore, the sealing element 28 of the sealing assembly 22 has a surrounding bead 66 for protecting the bellows mouth 64, the bead 66 extending axially towards the sealing bellows 20 (see FIG. 20). In particular when using pressure washers, it has been found that the bead 66 prevents a direct contact of splashed water with a bellows sealing lip 68 of the bellows mouth 64 by a deflection of the high pressure jet, the useful life of the bellows sealing lip 68 being thus increased.

Like in the embodiments shown above, the ring flange 32 of the retaining ring 26 firmly held on the conical shank portion 16 is pressed against a contact surface of the component 42 upon assembling of the sealing assembly 22, the part of the elastic sealing element 28 mounted to the flange lower side 36 with an interlocking fit causing a sealing of the contact point to the component 42 and therefore preventing a progressing corrosion infiltration by penetrating moisture at the shank portion 16 of the ball stud 12. To ensure a particularly reliable sealing with respect to the component 42, the resting surface 60 of the sealing element part mounted to the flange lower side 36 is preferably configured in a profiled manner (see FIG. 18).

The realization of the sealing element 28 with the surrounding sealing lip 62 and/or the surrounding bead 66 for a protection between the contact point between the retaining ring 26 and the sealing bellows 20 is possible in all embodiments of the sealing assembly 22 in which the sealing element 28 adjoins the flange upper side 34.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A sealing assembly of a ball joint for a vehicle comprising:
 a retaining ring which includes a ring axis and a radial ring flange having a flange upper side and an opposed flange lower side, and
 a sealing element which rests against the flange upper side and against the flange lower side and is connected to the retaining ring with an interlocking fit,
 the interlocking fit being configured such that the retaining ring and the sealing element are fixed to each other free of play in the axial and in the radial direction,
 the sealing element engaging around a radially outer peripheral edge of the ring flange, the ring flange having a radially extending inner portion separated from a radially extending outer portion by a circumferentially extending completely surrounding axial step, the radially extending inner portion and the radially extending outer portion extending substantially parallel to one another, the surrounding axial step being provided within a portion of the ring flange which is configured to include the interlocking fit between the retaining ring and the sealing element and the radially extending inner portion and the radially extending outer portion both having a lower side which is covered with the sealing element, and the flange upper side having an exposed contact surface for a sealing bellows.

2. The sealing assembly according to claim 1, wherein at least one recess is provided on the ring flange and at least one projection is provided on the sealing element, the at least one projection of the sealing element engaging in the at least one recess of the ring flange to realize the interlocking fit.

3. The sealing assembly according to claim 1, wherein the retaining ring and the sealing element are fixed to each other free of play in a peripheral direction by means of the interlocking fit.

4. The sealing assembly according to claim 1, wherein the ring flange has a peripheral edge which runs out freely outwards in the radial direction.

5. The sealing assembly according to claim 1, wherein the retaining ring and the sealing element can be detached from each other only by destruction.

6. The sealing assembly according to claim 1, wherein the sealing element is directly injection-molded with the retaining ring.

7. A sealing assembly of a ball joint for a vehicle comprising:

a retaining ring having a ring axis and a radial ring flange, and a sealing element connected to the retaining ring with an interlocking fit, wherein at least one recess being provided on the ring flange and at least one projection being provided on the sealing element, the at least one projection of the sealing element engaging in the at least one recess of the ring flange to realize the interlocking fit, the sealing element engaging around a radially outer peripheral edge of the ring flange, and the ring flange having a radially extending inner portion separated from a radially extending outer portion by a circumferentially extending completely surrounding axial step, the radially extending inner portion and the radially extending outer portion extending substantially parallel to one another, the surrounding axial step being provided within a portion of the ring flange which is configured to include the interlocking fit between the retaining ring and the sealing element and the radially extending inner portion and the radially extending outer portion both having a lower side which is covered with the sealing element.

8. The sealing assembly according to claim 7, wherein the at least one projection and the at least one recess are configured so as to be complementary so that the retaining ring and the sealing element are fixed to each other free of play in the axial and in the radial direction.

9. The sealing assembly according to claim 7, wherein the at least one recess in the ring flange is configured as a through opening.

\* \* \* \* \*